(12) United States Patent
Heller et al.

(10) Patent No.: US 6,863,333 B2
(45) Date of Patent: Mar. 8, 2005

(54) SHELF OF A CONVERTIBLE

(75) Inventors: Alexander Heller, Munich (DE); Burkhard Reinsch, Kaufbeuren (DE)

(73) Assignee: Open Air Systems GmbH, Stockdorf (DE)

( * ) Notice: Subject to any disclaimer, the term of this patent is extended or adjusted under 35 U.S.C. 154(b) by 0 days.

(21) Appl. No.: 10/658,605

(22) Filed: Sep. 10, 2003

(65) Prior Publication Data

US 2004/0124660 A1 Jul. 1, 2004

(30) Foreign Application Priority Data

Sep. 11, 2002 (DE) .......................................... 102 42 451

(51) Int. Cl.⁷ .................................................. B60J 7/00
(52) U.S. Cl. ............................. 296/107.09; 296/24.44; 296/136.04
(58) Field of Search ...................... 296/107.01, 107.05, 296/136.04, 135, 108, 24.44, 116, 107.09

(56) References Cited

U.S. PATENT DOCUMENTS

| | | | | |
|---|---|---|---|---|
| 2,181,869 A | * | 12/1939 | Carr ........................ | 296/107.2 |
| 6,030,023 A | | 2/2000 | Guillez | |
| 6,145,915 A | | 11/2000 | Queveau et al. | |
| 6,419,296 B2 | * | 7/2002 | Dintner et al. ......... | 296/107.18 |
| 6,422,636 B2 | * | 7/2002 | Mentink ................. | 296/107.01 |
| 6,454,342 B2 | * | 9/2002 | Heselhaus et al. ..... | 296/107.07 |
| 6,663,163 B2 | * | 12/2003 | Koch .................... | 296/107.08 |
| 6,672,645 B2 | * | 1/2004 | Quindt .................. | 296/107.08 |
| 2004/0036312 A1 | | 2/2004 | Eichholz et al. | |

FOREIGN PATENT DOCUMENTS

| | | |
|---|---|---|
| DE | 100 64 364 C1 | 6/2002 |
| EP | 0 949 105 A1 | 10/1999 |
| EP | 1 136 295 A2 | 9/2001 |
| EP | 0 860 313 B1 | 5/2002 |
| WO | WO 2004/009388 A1 | 1/2004 |

* cited by examiner

Primary Examiner—D. Glenn Dayoan
Assistant Examiner—Patricia L. Engle
(74) Attorney, Agent, or Firm—Nixon Peabody LLP; David S. Safran

(57) ABSTRACT

A convertible roof is provided which includes a shelf which can be lowered into a rear stowage space of a convertible. The shelf is movably supported as it is assigned to a rear roof part of the lowerable roof and can be adjusted by an adjustment device between an operating position with the roof closed and a lowered position in which it is moved against the inside of the rear part of the roof which has been lowered into the stowage space, thereby providing space-saving stowage of the roof. The shelf has two opposing outer side areas which can be swiveled relative to a middle part of the shelf.

12 Claims, 6 Drawing Sheets

SHELF OF A CONVERTIBLE

BACKGROUND OF THE INVENTION

1. Field of the Invention

The invention relates to a shelf of a convertible with a convertible roof which can be lowered into a rear stowage space of the convertible, and a convertible with such a shelf.

2. Description of Related Art

European Patent application 0 860 313 B1 discloses a generic shelf of a convertible which is pivotally supported on a separating wall between the vehicle seats and the trunk space and can be swiveled out of its horizontal operating position within or underneath the rear roof part of the closed convertible roof into a vertical intermediate position onto the back of the separating wall in order to clear a passage for depositing the roof in the stowage space in the trunk. The swiveling motion of the shelf is controlled by the swiveling motion of the trunk lid which forms the cover of the convertible top compartment and which can be swiveled up on its front edge for depositing the roof. When the roof has been deposited in the stowage space, the closing trunk lid is swiveled back into its operating position for covering the passage opening.

European Patent application 0 949 105 A1 discloses a shelf of a convertible which is pivotally mounted on the front edge of the trunk lid which is used as the cover of the convertible top compartment and is swiveled out of its horizontal operating position within or underneath the rear roof part of the closed convertible roof into an intermediate position to the rear and under the trunk lid when the roof is being deposited in the stowage space. With the roof deposited, it is again swiveled forward and, as the front extension of the trunk lid, forms a covering of the passage opening for the roof which is to be deposited.

SUMMARY OF THE INVENTION

One object of the present invention is to provide a shelf which is supported and can be moved such that, together with the roof which has been lowered into the roof stowage space, it requires only little stowage space.

The above object, and other objects, are achieved by providing a shelf that is movably supported as it is assigned to the rear roof part of the lowerable roof and can be adjusted by an adjustment means between the operating position with the roof closed and the lowered position in which it is moved against the inside of the rear part of the roof which has been lowered into the stowage space. Since the shelf is moved against the rear roof part when the roof is being lowered, the stowage space which is required in the vertical direction for the lowered roof parts is diminished. Due to the space-saving deposition of the shelf between the two deposited roof parts, the shelf does not require any additional stowage space outside the compactly arranged roof parts.

Preferably the shelf is supported in a manner to swivel around a swiveling axis which is located in the area of its rear edge and in particular the shelf is pivotally connected to the rear roof part in the area of its back edge. This yields an especially simply configured support of the shelf which is moved with the rear roof part so that only swiveling motion of the shelf need be produced. But the shelf can also be moved between its two positions by means of its own bearing device.

Accordingly, the shelf can be swiveled into the rear roof part when the roof is being deposited or can be caused to approach the rear roof part by a displacement motion.

It is especially preferred that the shelf have two opposing outer side areas which can be swiveled relative to its middle part. Then the shelf can be adapted to the conventionally curved shape of the rear roof part when it is moved against the inside of the rear roof part. The side areas and the middle part of the shelf can be made of the same material or of different materials. In one simple configuration, the shelf contains a weakening zone or weakening line around which each side area can be swiveled in its entirety. The side area, however, can also be made flexible such that it curves or bends to match the curvature of the rear roof part itself. Generally the shelf can be changed from its essentially planar, flat configuration which it assumes in its operating position, into a curved shape which is matched to the rear roof part or to the rear and another roof part which is located under it.

In the closed position, the shelf of the roof may be pretensioned down into its operating position so that it cannot produce rattling noise while driving. The pretensioning can be produced by a spring force device or the like.

The motion, or the swiveling-in, of the shelf against the rear roof part takes place preferably by means of a control lever which is in contact with the bottom of the shelf and swivels or moves it against the rear roof part when the roof is being lowered. The control lever is, for example, attached to the bearing mechanism of the roof or of the rear roof part, and on the bottom of the shelf, is in control engagement continuously on the elongated engagement surface or only when the roof is being lowered. The elongated engagement surface can be a sliding or rolling support formed on the bottom in the middle part of the shelf either as one piece with the shelf or attached to the shelf as an independent component.

On the rear roof part, there may be, laterally, one pressure pad at a time which in the lowered position of the roof keeps the side area of the swiveled shelf swiveled relative to its middle part.

With this shelf, the rear roof part can be deposited pointing up with its outer side in the lowered position and at least the second roof part can be located with an identical camber to the rear roof part underneath the shelf to save space.

DETAILED DESCRIPTION OF THE INVENTION

Figure 1:
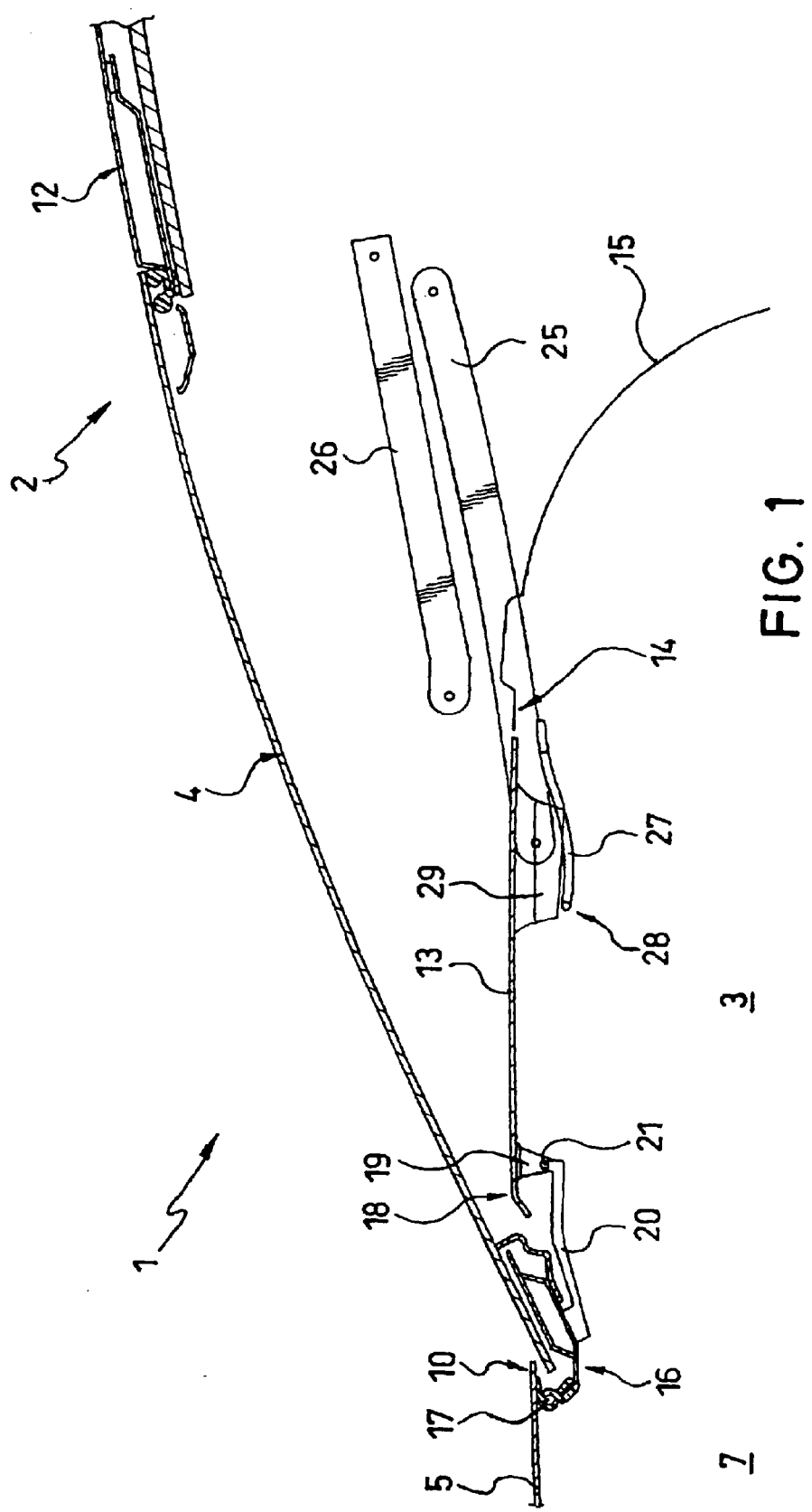
FIG. 1 shows, in partial schematic, a lengthwise sectional view of an extract of the rear area of a convertible with the shelf of the present invention, with the roof closed.
Figure 3:
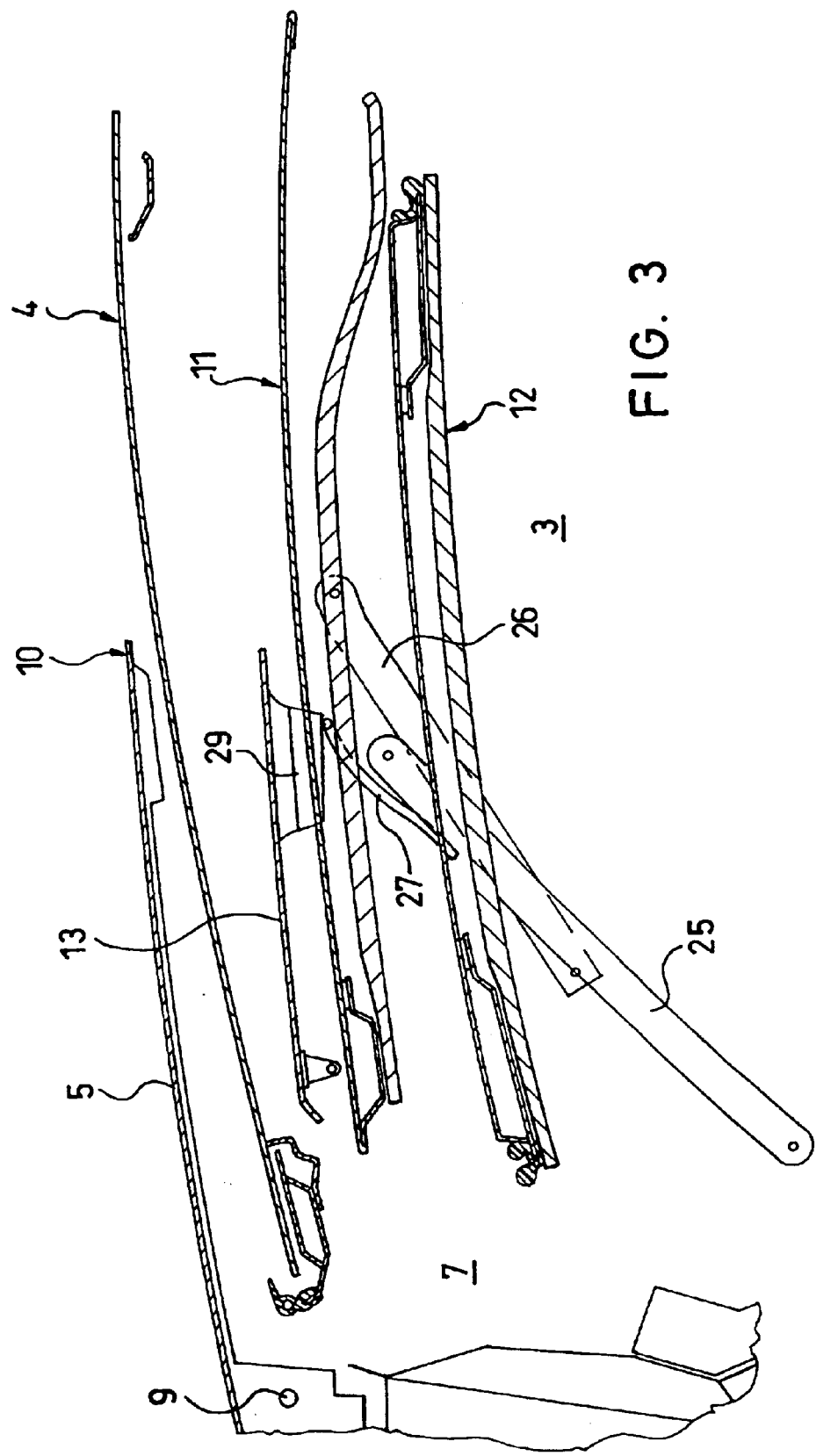
FIG. 3 shows in a lengthwise sectional view as shown in FIG. 1, the shelf in its end position, with the opened, deposited roof.
Figure 4:
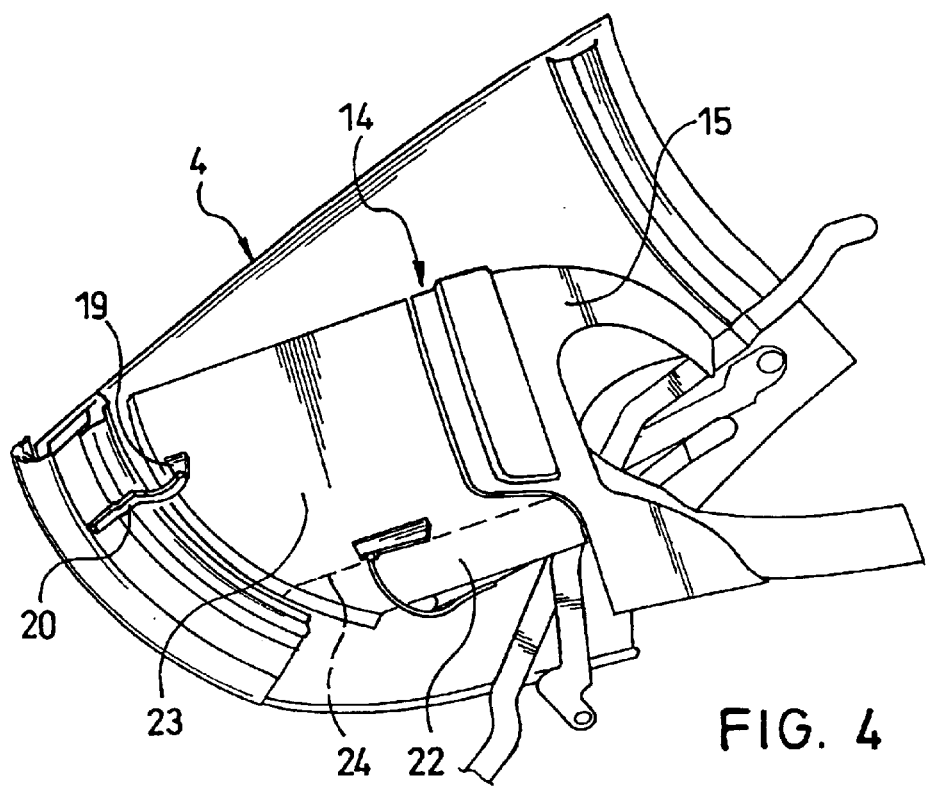
FIG. 4 shows in a perspective bottom view of the left half of the rear roof part of the lowerable roof of the convertible with the shelf, with the roof closed.
Figure 5:
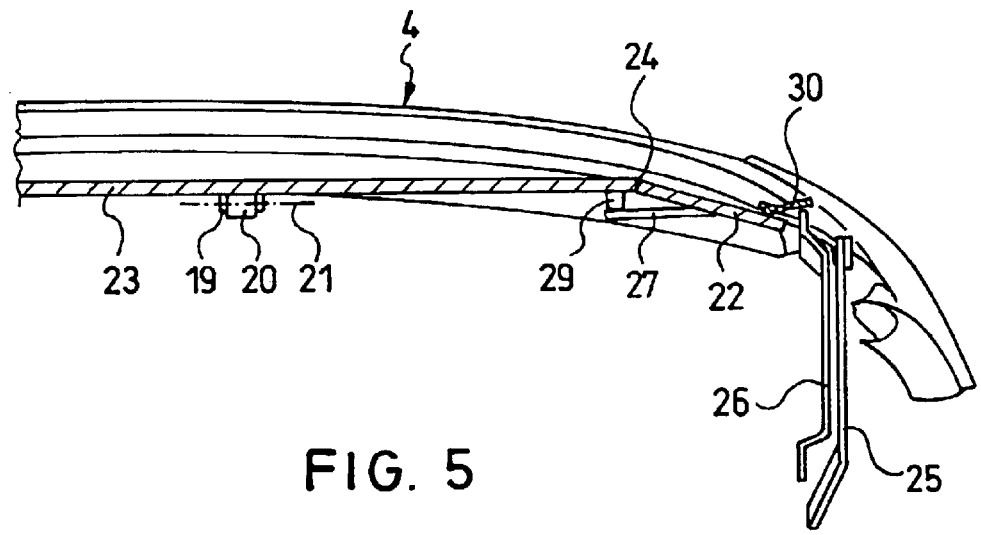
FIG. 5 shows, in a front view, the shelf of the present invention with the roof deposited.
Figure 6:
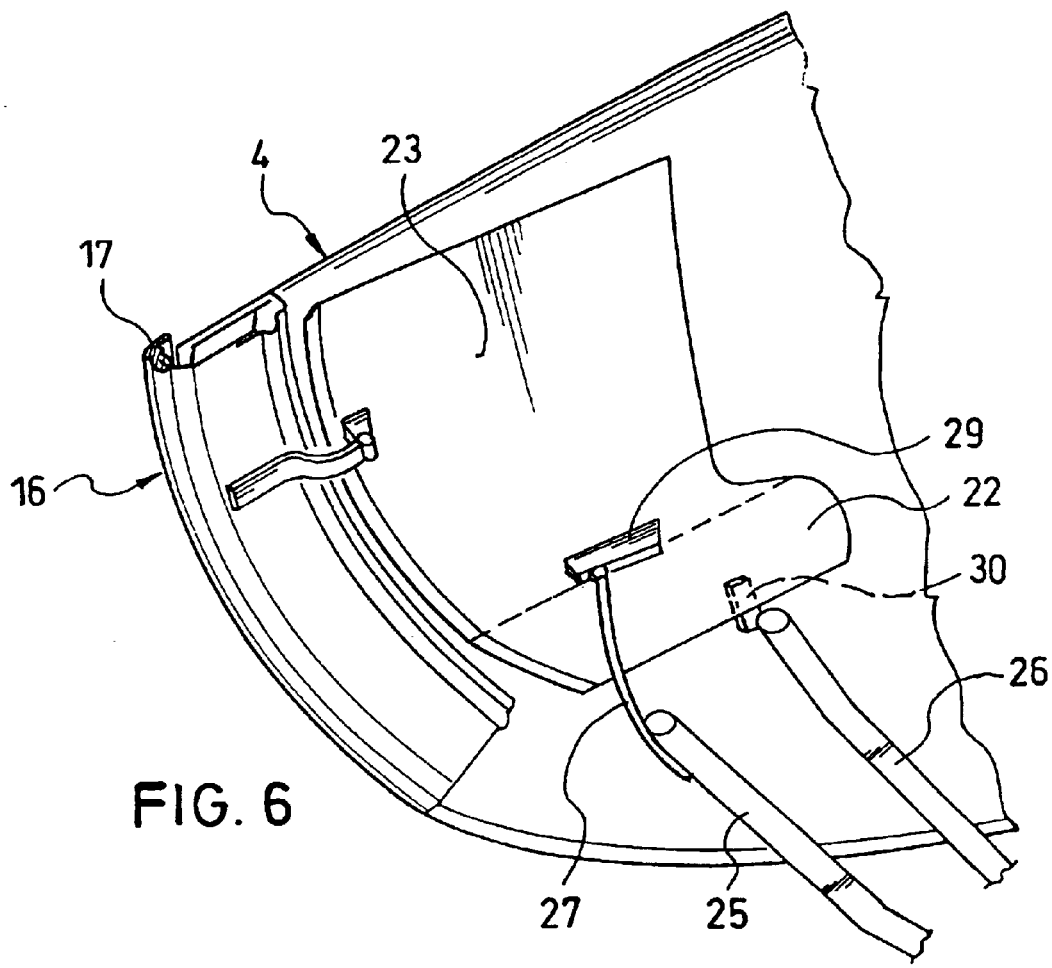
FIG. 6 shows, in a perspective bottom view, the left half of the rear roof part with the shelf, with the roof deposited.
Figure 7:
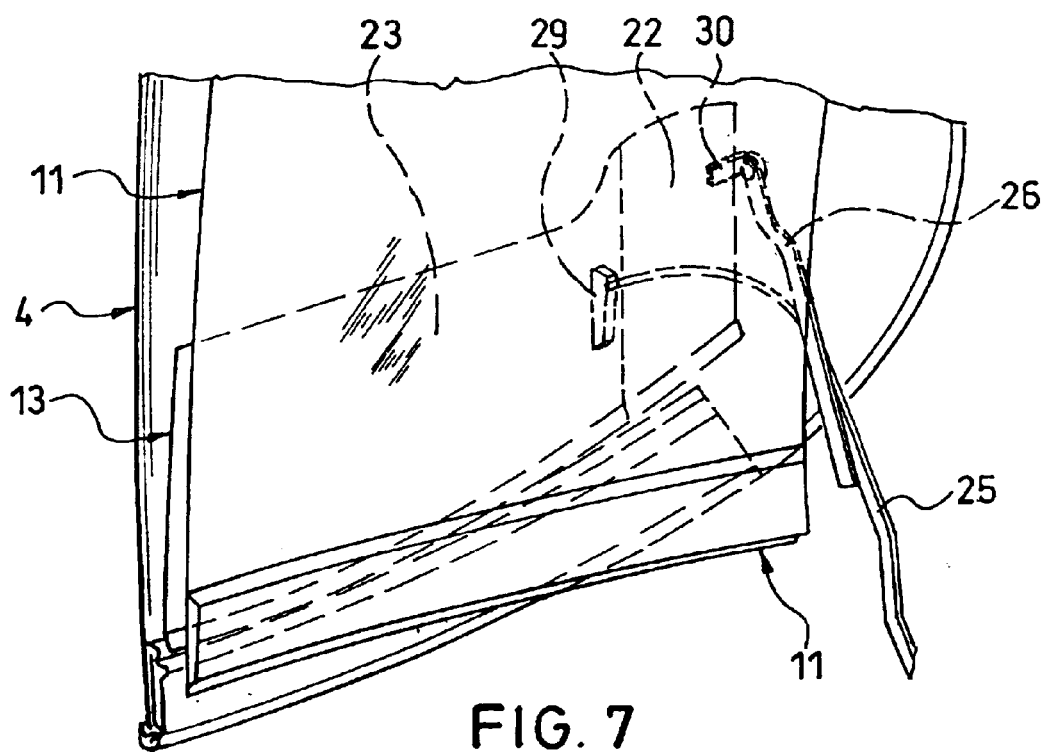
FIG. 7 shows, in another perspective bottom view, the left half of the rear roof part with the shelf, with the roof deposited, another roof part underneath the shelf being shown.
Figure 8:
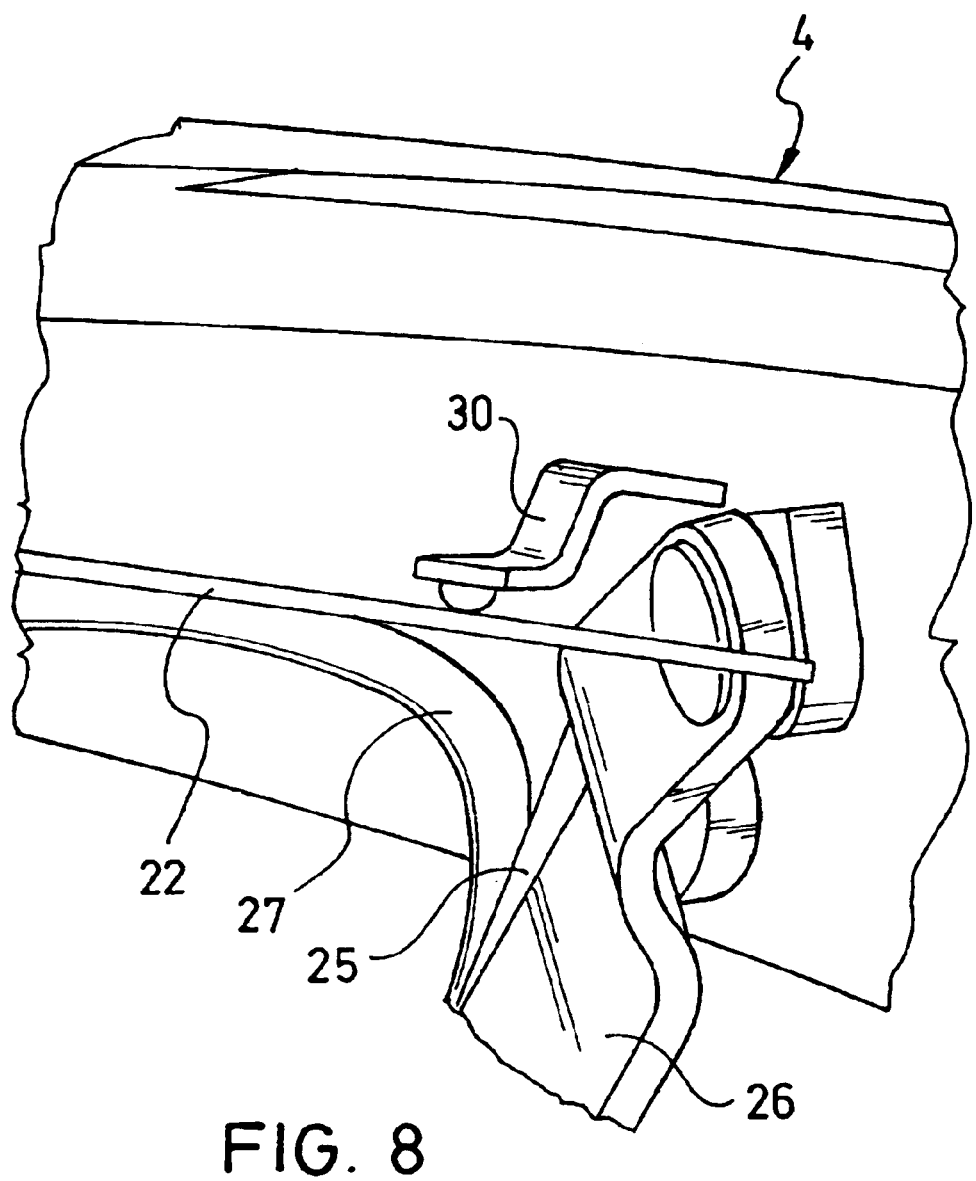
FIG. 8 shows, in a perspective overhead view of an enlarged extract, a pressure pad for one side area of the shelf, with the roof lowered.

A convertible 1 contains a movable roof 2 which can be lowered for opening and which can be moved between a closed position (FIG. 1) over the vehicle interior and an open position (FIG. 3) in which it is deposited in a rear stowage space or convertible top compartment 3. According to the embodiment shown, the roof 2 is a movable hardtop with several rigid roof parts which are located in succession in the closed position, as disclosed, for example, in general, in German patent application 199 43 860 A1 and as described especially in German patent application file number 101 50 2218.4. The roof 2 can also alternatively be a flexible soft top with foldable convertible top rods. The roof part 4 or C segment (FIG. 1), which is the rear part in the closed position of the roof 2 and which contains a rear window, adjoins the trunk lid 5. The roof part 4 is supported on the body by means of a pivot bearing means (not shown) for swiveling around a front swiveling axis and can be swiveled up to clear a cargo opening for loading and unloading of the trunk space 7.

The trunk lid 5, which also covers the convertible top compartment 3 occupying for example part of the trunk 7, is supported for swiveling around a rear swiveling axis 9 by a rear bearing means and is swiveled up around this swiveling axis 9 with its front edge 10 to clear a passage opening for the roof 2 so that the roof 2 can be deposited in the convertible top compartment 3 or can be telescoped out of it. When a, for example, three-piece hardtop roof 2 is being lowered, the front roof part 11 (FIG. 3) swivels onto the middle roof part 12 and the rear roof part 4 swivels over these two roof parts 11 and 12 before all the roof parts are lowered into the convertible top compartment 3. A lowering mechanism which enables this lowering motion is described in the aforementioned older German patent application 101 50 218.4.

In the closed state of the roof 2, a shelf 13 extends from the upper or rear edge 14 of a separating structure 15 which borders the trunk space 7 or the convertible top compartment 3 relative to the vehicle interior to the rear as far as the lower edge 16 or the lower frame part of the rear roof part 4. The separating structure 15 can be an independent part or even the back of the vehicle seats. The rear roof part 4 has a seal 17 which is pressed, in the closed state of the roof 2, against the bottom of the trunk lid 5. The shelf 13 in the area of its rear edge 18 contains, on the bottom, a bearing means which includes, for example, two bearing brackets 19 which are spaced apart from one another in the transverse direction and located on either side of the vertical lengthwise center plane of the vehicle. Each bearing bracket 19 is movably supported on one assigned carrier part 20 which is attached to the bottom frame part 16 of the rear roof part 4 for swiveling around the transverse swiveling axis 21. Furthermore, the shelf 13 on its lateral outside edges contains one outer side area 22 (see FIGS. 4 to 7 in which only one half of the roof with the pertinent parts is shown at a time) which can swivel relative to the middle part 23 of the shelf 13. Each flap-like side area 22 can be moved around a swiveling or bending line 24 which runs roughly in the lengthwise direction and which is formed, for example, by a weakening of the material, a hinge or a joint.

The rear roof part 4 is pivotally mounted by means of two connecting rods 25 and 26 of a four-bar mechanism on the roof lowering mechanism, for example on a main four-bar mechanism which movably supports the middle roof part 12 on the body (corresponding to the embodiment described in German patent application 101 50 218.4).

A curved control lever 27 is attached to the rear connecting rod 25 of the four-bar mechanism and extends inwardly from the connecting rod 25. A free end 28 of the curved control lever 27 adjoins the bottom of the sliding support 29 which is located on the bottom of the middle part 23 of the shelf 13 in the lengthwise direction and inwardly next to the lengthwise running swivel line 24 for the outer side area 22.

With the roof 2 closed (FIG. 1), the shelf 13 is pretensioned down, for example, by a spring means (not shown) into its rest position against the respective side control lever 27. The shelf 13 is thus arranged roughly horizontally and, with its front edge, borders the rear edge 14 of the separating structure 15 of the convertible behind the vehicle seats.

Figure 2:
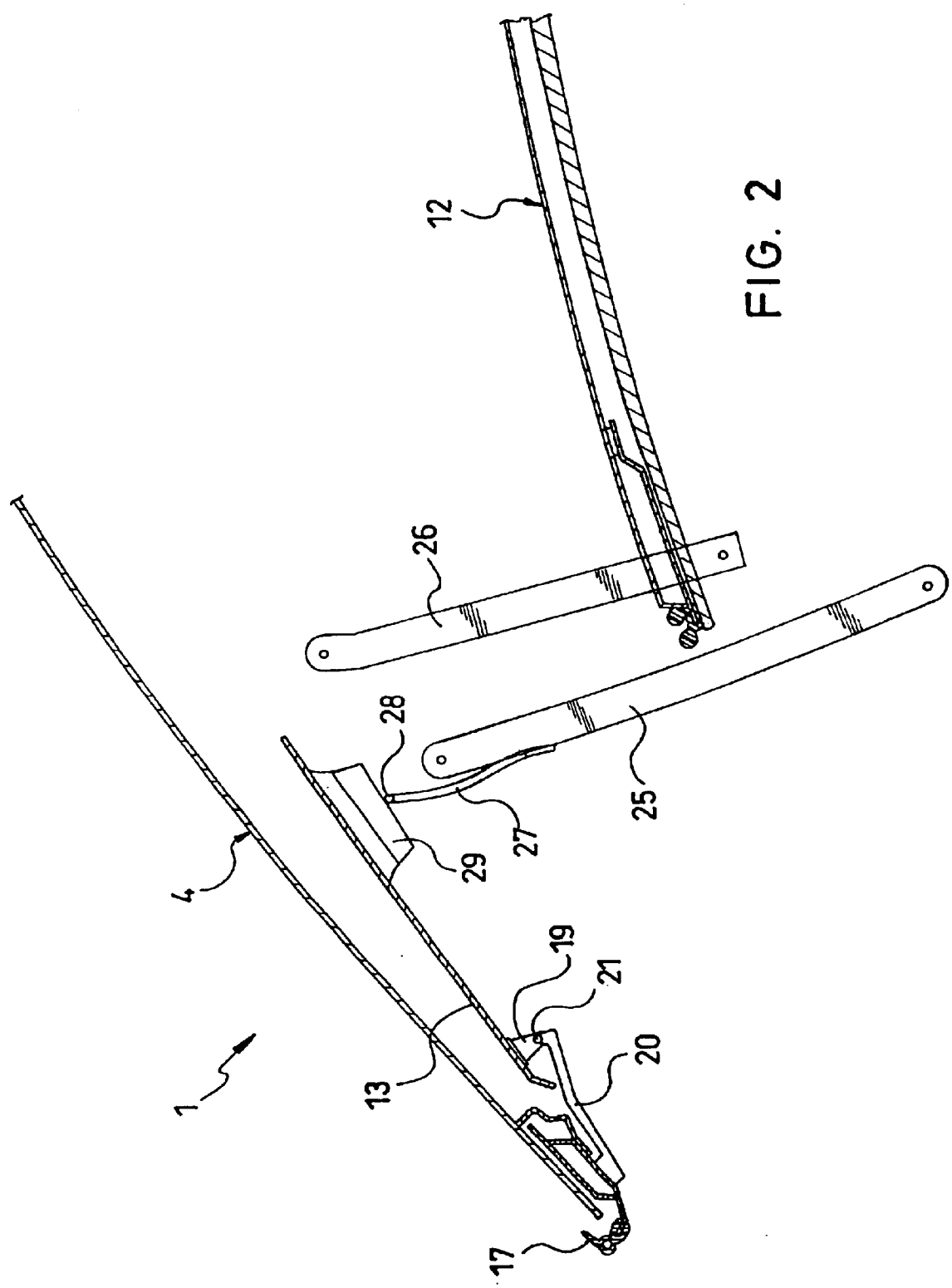
FIG. 2 shows in a lengthwise sectional view as shown in FIG. 1, the shelf in an intermediate position when the roof is being opened and deposited.

To open and deposit the roof 2, first the trunk lid 5 is raised by a drive means (not shown) by swiveling around its rear swiveling axis 9 on its front edge 10. Then the rear roof part 4 is swiveled up by means of the two connecting rods 25, 26 (FIG. 2 shows the intermediate position). The control lever 27 is in sliding engagement on the sliding support 29 to swivel the middle part 23 of the shelf 13 up around the swiveling axis 21 against the inside of the rear roof part 4. In the course of swiveling of the shelf 13, the side area 22 of the shelf 13 lies against a pressure pad 30 which is permanently attached to the inside of the rear roof part 4 in its side edge area. The pressure pad 30 thus lies on the top of the side area 22 of the shelf 13 and prevents the side area 22 from continuing to swivel jointly with the middle part 23 around the swiveling axis 21 so that the side area 22 is increasingly swiveled around the swiveling line 24 relative to the middle part 23 of the shelf 13.

In the lowered end position (FIG. 3) of the roof 2, the middle part 23 of the shelf 13 is clearly swiveled against the inside of the rear roof part 4 while each side area 22 is swiveled following the curvature of the rear roof part 4 in its edge area, depending on the configuration of the rear roof part 4, by, for example, 10 to 30 degrees around the swiveling line 24. The front roof part 11 which is curved in the transverse direction can thus be located in the lowered position (FIG. 3) nearer the bottom of the shelf 13 or the inside of the rear roof part 4 so that less stowage space in the vertical direction in the convertible top compartment 3, or in the trunk 5, is required by the adaptable shelf 13 for the roof 2.

Since the driving and swiveling motion of the shelf 13 is derived from the motion of the two connecting rods 25 and 26 by means of the control lever 27, it does not require its own drive for the adjustment of the shelf 13, and thus the connecting rods 25 and 26, and control lever 27 function as an adjustment device for the shelf 13.

When the roof 2 is being closed the movements take place in the opposite direction for those movements described hereinabove.

A roller element or the like may be provided on the engagement end 28 of control lever 27 so that instead of sliding engagement, the control lever 27 rolls on the support 29 or other type of surface on the shelf 13.

We claim:

1. A convertible roof movable into a closed position and lowerable into a lowered position in a rear stowage space, comprising:

a rear roof part;

a shelf movably supported relative to the rear roof part;

an adjustment means for adjusting the shelf between an operating position with the roof closed and a lowered position in which the shelf is positioned against an inside of the rear roof part positioned in the rear stowage space.

2. The convertible roof of claim 1, wherein the shelf can be swiveled around a swiveling axis located in an area of a rear edge of the shelf.

3. The convertible roof of claim 1, wherein the shelf is pivotally connected to the rear roof part in an area of a rear edge of the shelf.

4. The convertible roof of claim 2, wherein the shelf swivels into the rear roof part when the roof is being lowered.

5. The convertible roof of claim 1, wherein the shelf has two opposing outer side areas which can be swiveled relative to a middle part of the shelf.

6. The convertible roof of claim 1, wherein the shelf, in the closed position of the roof, is pretensioned down into an operating position.

7. The convertible roof of claim 1, further including a control lever in contact with a bottom of the shelf to move the shelf against the rear roof part when the roof is being lowered.

8. The convertible roof of claim 7, wherein the control lever is attached to a bearing mechanism of the roof.

9. The convertible roof of claim 7, wherein an elongated engagement surface is formed on the bottom of the shelf for control engagement by the control lever.

10. The convertible roof of claim 5, further including a pressure pad positioned laterally on the rear roof part to keep a respective side area of the swiveled shelf swiveled relative to a middle part of the shelf when the roof is in the lowered position.

11. The convertible roof claim 1, wherein the rear roof part points up with its outer side in the lowered position, further including a second roof part located underneath the shelf with an identical camber to a camber of the rear roof part.

12. The convertible roof of claim 1, wherein the shelf is aligned generally parallel to said rear roof part in said lowered position.

* * * * *